Oct. 7, 1930.  L. D. HOULIS  1,777,885
ZONED BAKING OVEN
Filed Jan. 21, 1928   2 Sheets-Sheet 1

INVENTOR
Louis D. Houlis
BY
Jack A. Ashley
ATTORNEY

Oct. 7, 1930.  L. D. HOULIS  1,777,885

ZONED BAKING OVEN

Filed Jan. 21, 1928  2 Sheets-Sheet 2

INVENTOR
LOUIS D. HOULIS
BY
ATTORNEY

Patented Oct. 7, 1930

1,777,885

UNITED STATES PATENT OFFICE

LOUIS D. HOULIS, OF CINCINNATI, OHIO

ZONED BAKING OVEN

Application filed January 21, 1928. Serial No. 248,408.

This invention relates to a zoned baking oven and particularly to a construction portable in character and adapted to be used in a plurality of assembled units.

In the ordinary construction of making ovens the heating medium is common to the entire area of the oven and is generally disposed beneath the baking chamber to directly act thereon. This results in intense heat upon the chamber at a point above the burners, while the remainder of the chamber remains at a lower temperature which causes uneven baking of the contents of the oven.

To avoid these objects I provide a construction including a plurality of separately controlled heating zones so arranged as to control the temperature at different parts of the oven, and the heating medium is arranged at the inlet to these zones to avoid any direct contact with the baking chamber. These improved results are in part secured by disposing a plurality of closed flues at opposite sides of the base of the oven with their outlets adjacent the center thereof beneath a superposed baking chamber to effect an outward flow of heat beneath the chamber, upward over the sides thereof, and thence over the top of the chamber to a centrally disposed outlet in the oven casing. It is also very desirable to produce these ovens as unit sections of relatively small height which can be assembled in superposed relation and separately controlled to provide the desired oven capacity.

The heating of this type of oven is greatly facilitated and economized by the use of a special form of burner provided with a secondary air inlet immediately adjacent the point of combustion by which a larger body of air may be heated and maintained at the required temperature of the baking chamber to effect the most efficient results.

The invention has for an object to provide a novel and improved baking oven having a baking chamber at its upper portion and provided at its base with inwardly extending flues from opposite sides of the casing discharging centrally beneath and around said chamber, together with independent heating means for each flue.

A further object of the invention is to present a new flue arrangement comprising a series of independently controlled heating zones communicating with a baking chamber enclosed thereby and permitting a regulation of the temperature at each zone and in all parts of the oven.

Another object of the invention is to provide a plurality of inwardly extending heat flues terminating centrally of the oven in spaced relation to a transverse partition adapted to support a baking chamber in contact with said flues to effect a heat circulation beneath and over the top of the chamber to an outlet in the oven casing.

A still further object is to provide for efficient heat circulation by the use of oppositely disposed circuitous flues having at their inlets fluid burners with air feeding nozzles disposed to deliver at the point of combustion of the burners.

Other and further objects and advantages of the invention will be hereinafter set forth and the novel features thereof defined by the appended claims.

In the drawings:—

Like references refer to like parts in the several figures of the drawings.

Figure 1:
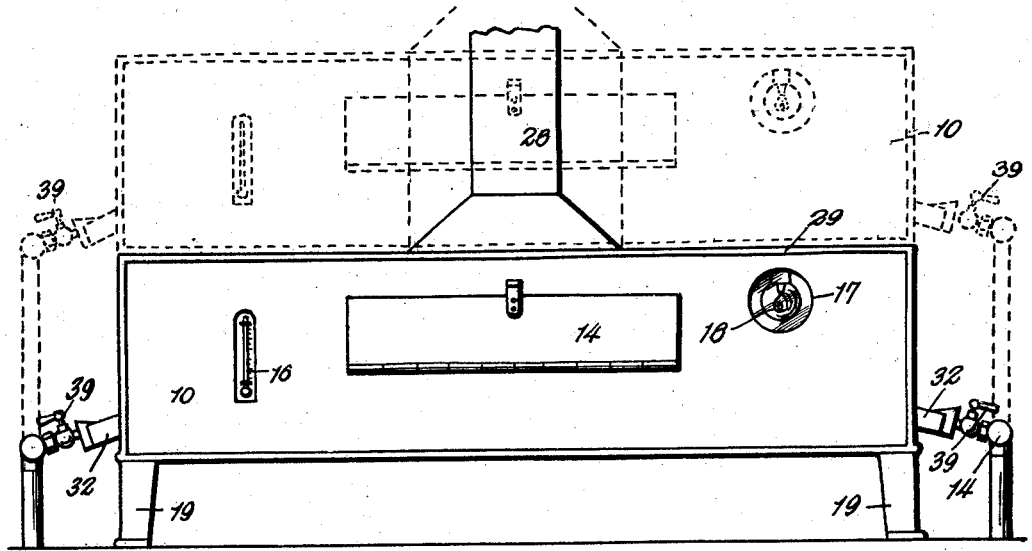
Figure 1 is a front elevation of the invention.
Figure 2:
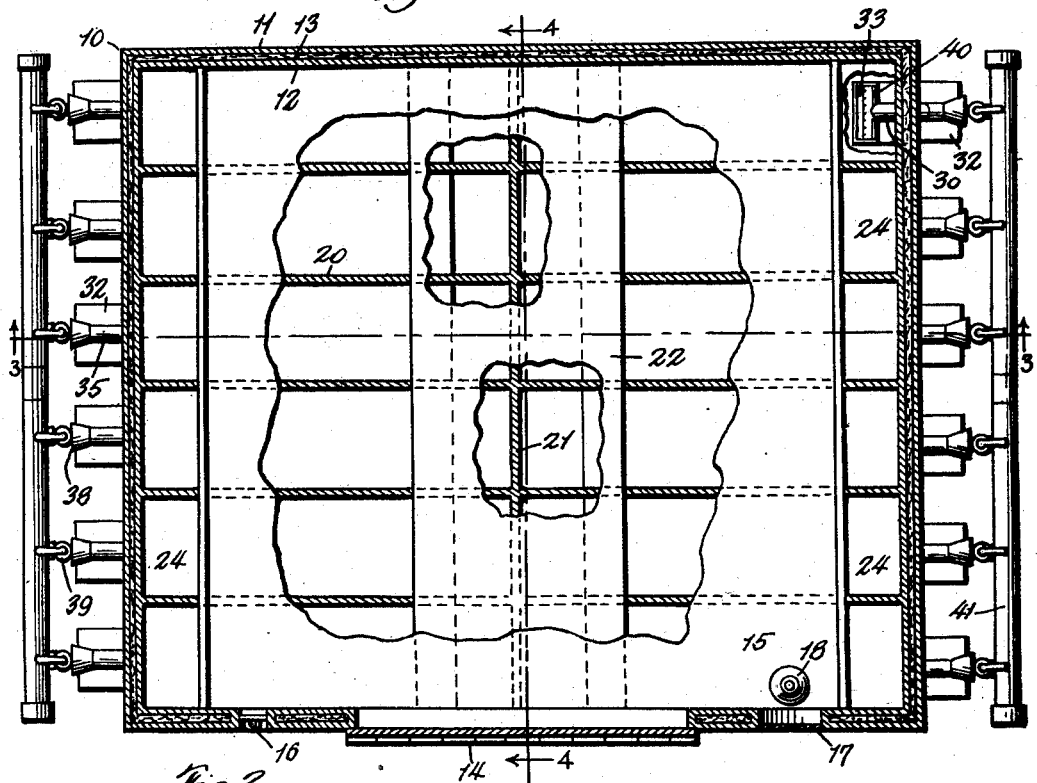
Figure 2 is a section on line 2—2 of Fig. 3.
Figure 3:
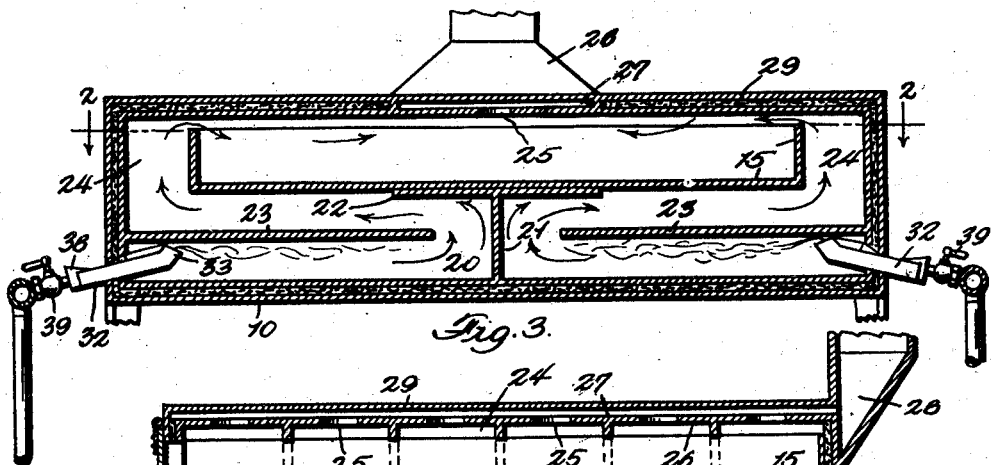
Figure 3 is a similar view on line 3—3 of Fig. 2.
Figure 4:
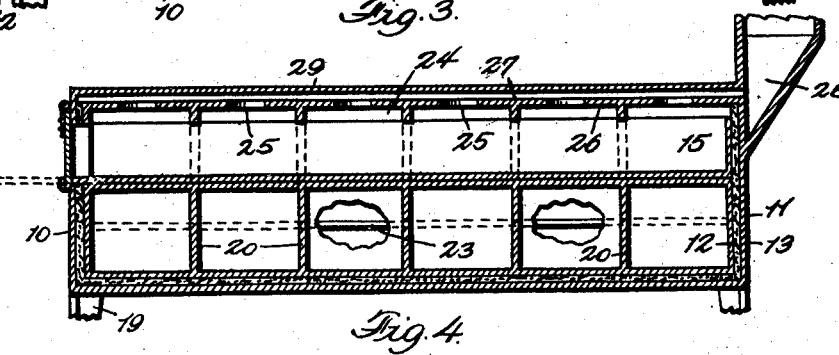
Figure 4 is a section on line 4—4 of Fig. 2.
Figures 5, 7:
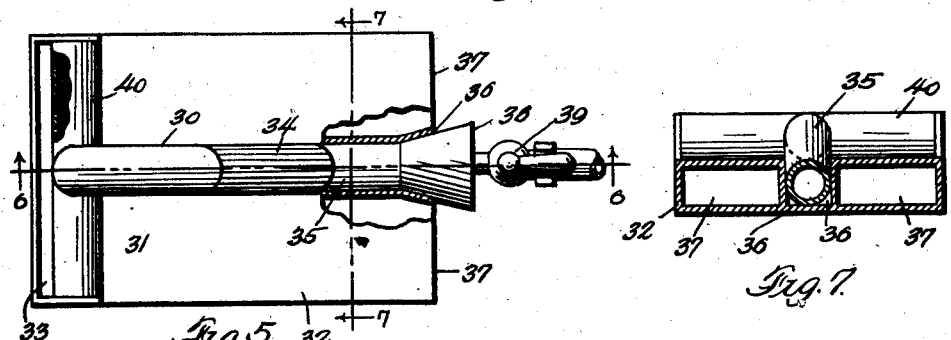
Figure 5 is a top plan of the burner with parts broken away.
Figure 7 is a like view on line 7—7 of Fig. 5.
Figure 6:
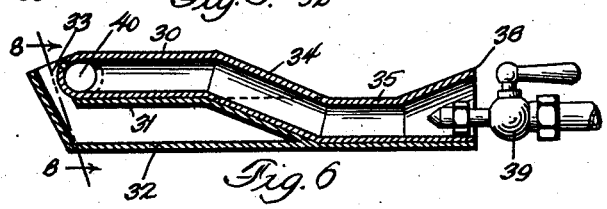
Figure 6 is a section on line 6—6 of Fig. 5.
Figure 8:
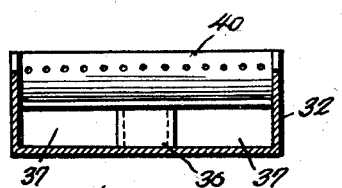
Figure 8 is a section on line 8—8 of Fig. 6.

The oven casing 10 may be of any desired configuration or construction, but is preferably formed with an outer wall 11 and an inner wall 12 with an intermediate heat insulating packing 13. This casing has the usual door 14 communicating with the baking chamber 15 and the thermometer 16. Also a sight opening 17 is formed opposite an illuminating device 18, as shown in Figs. 1 and 2. If desired, the oven unit may be provided with supporting legs 19, but when these units are superposed upon each other, as shown by dotted lines in Fig. 1, these legs are omitted and the required number of oven sections used.

For the purpose of producing a plurality of parallel heating zones a series of partitions 20 are extended continuously from side to side of the casing and from the base to the top thereof, with the exception of the space occupied by the baking chamber 15. These partitions are intersected beneath this chamber by a transverse partition 21 carrying at its upper portion a supporting shelf 22 for the chamber 15. Each of the flues or zones is also provided with a horizontal plate 23 extending inwardly from the sides but terminating in spaced relation to the partition 21 to provide a circuitous passage for the heat. The plates 23 are arranged intermediate the base of the casing and the chamber to form a flue space 24 extending beneath and about the sides of the chamber and also above the same, so that the heat passes over the top thereof and escapes at the central openings 25 in the inner top wall 26 at each flue space which communicate with a flue 27 discharging into a suitable stack 28 disposed at one side of the oven casing. This provides a flat closed top wall 29 adapted to support the oven units upon each other when so used, and forms a unit readily portable and conveniently assembled for use.

Each of the independent heat zones is provided with a separate burner, and a very desirable form for cooperation with the zone flues is shown, but not specifically claimed herein. The mixer tube 30 is supported upon the upper wall 31 of an air trunk 32 extending transversely of the flue and having an upwardly directed discharge 33 disposed to project the products of combustion against the horizontal plate 23 within the flue. The tube 30 is formed with an inclined portion 34 and a lower section 35 which lie within a seat 36 formed in the air trunk which seat divides the trunk into parallel inlets 37. At the funnel end 38 of the mixer the fuel jet 39 is disposed and valve controlled from a feed pipe 41 in the usual manner, to provide for the primary air and fuel mixture. The opposite end of the mixer is formed with the lateral burner head 40 perforated as desired and lying parallel to the secondary air inlet 33 from the trunk. By such a construction I secure the most efficient cooperation between the structure of zone flues shown and heating means for maintaining the necessary temperature therein and about the baking chamber.

The operation of the invention will be apparent from the foregoing description from which it will be seen that a simple and very efficient oven unit is produced adapted to be easily transported and assembled in superposed relation to provide any required oven capacity, and each zone flue has independent heating means so that the temperature at any point in the baking chamber can be accurately controlled. The flue construction provides for heating the horizontal plate at the inlet portion and thus maintains a uniform temperature in the portion of the flue above said plate. The baking chamber is so disposed relative to the parallel series of flues that all portions of the chamber are exposed to the heat and results in the most efficient baking operation and control thereof.

While the specific construction of both the oven and burner have been shown and described the invention is not confined thereto as changes and alteration may be made therein without departing from the spirit of the invention as recited in the following claims.

What I claim is:—

1. In a baking oven, a baking chamber a plurality of independent parallel flues extending inwardly from opposite sides of the casing and enclosing the bottom and sides of said chamber, independently controlled fluid burners at the inlets to said flues formed with burner heads and a supplemental air inlet adjacent the point of combustion and elongated to extend for substantially the width of the flue.

2. A baking oven unit adapted to be superposed upon a similar unit and including a casing having a flat closed top with an outlet passage therein extending across the center and discharging at one side, a baking chamber in open communication with said top, a series of vertical partitions forming flues extending beneath and about the sides of the chamber, a centrally disposed transverse partition extending from the bottom of the chamber to the base of the casing and carrying a supporting shelf for the chamber, horizontal partitions within the flues, extending inward from the sides of the casing and spaced from the transverse partition, and separately controlled heating burners located at the inlets to each flue and discharging at their ends upwardly into contact with the horizontal partitions.

3. A baking oven unit adapted to be superposed upon a similar unit and including a casing, a baking chamber, a series of vertical partitions forming flues extending beneath and about the sides of the chamber, a centrally disposed transverse partition extending from the bottom of the chamber to the base of the casing and carrying a supporting shelf for the chamber, horizontal partitions within the flues, extending inward from the sides of the casing and spaced from the transverse partition, and separately controlled heating burners located at the inlets to each flue, said burners having supplemental air inlets discharging adjacent the points of combustion, and an outlet flue formed in the top of the casing and extending transversely of said flue with openings alined with each of the heating flues with a discharge at one side of the casing to leave an unobstructed top for the reception of a superposed unit.

4. In a baking oven, a casing formed with a baking chamber in its upper portion, a series of parallel vertical partitions extending from the bottom and ends of the chamber to the oven walls to form separate alined flues extending inwardly from opposite sides of the casing and terminating at the top of said chamber, and independently controlled heating means having an elongated discharge of substantially the width of the flue and disposed to direct a flame into contact with a wall thereof.

5. In a baking oven, a casing formed with a baking chamber in its upper portion, a series of parallel vertical partitions extending from the bottom and ends of the chamber to the oven walls to form separate alined flues extending inwardly from opposite sides of the casing and terminating at the top of said chamber, independently controlled heating means at the outer end of each flue, a centrally disposed outlet flue in the casing above said chamber extending transversely of the alined flues and communicating with each thereof, and a discharge stack at one end of said outlet flue to permit a superposed arrangement of casing units.

6. A baking oven as defined in claim 15 with a horizontal partition in each flue contiguous to the heating means thereof and against the surface of which the discharge from said heating means is directed, said partition being spaced and located to discharge heated air currents beneath the center of the chamber, and means at such discharge of heated air currents to divide the flues into independent series at each end of said chamber.

In testimony whereof I affix my signature.

LOUIS D. HOULIS.